D. L. COX.
CLUTCH RELEASING MECHANISM FOR TRACTORS.
APPLICATION FILED MAY 29, 1920.

1,382,478.

Patented June 21, 1921.

Inventor,
Dalmar L. Cox.

Attorney.

UNITED STATES PATENT OFFICE.

DALMAR L. COX, OF GREENVILLE, NORTH CAROLINA.

CLUTCH-RELEASING MECHANISM FOR TRACTORS.

1,382,478.  Specification of Letters Patent.  Patented June 21, 1921.

Application filed May 29, 1920. Serial No. 385,375.

*To all whom it may concern:*

Be it known that I, DALMAR L. COX, a citizen of the United States of America, and resident of Greenville, in the county of Pitt and State of North Carolina, have invented certain new and useful Improvements in Clutch-Releasing Mechanism for Tractors, of which the following is a specification.

This invention relates to tractors and particularly to clutch releasing means for automatically disconnecting the clutch members should the tractor assume an abnormal position, as often occurs when the tractor is being operated over uneven surfaces.

A still further object of this invention is to produce a clutch releasing mechanism operative to actuate the clutch releasing members when the tractor tilts rearwardly. It is well known that when a tractor is mired or the operator engages the clutch too quickly with the motor racing, the tractor will tip backward, sometimes rising so high that the operator cannot release the clutch in time to prevent him turning completely over. When a tractor tips or rises to the extent that the front wheels are free from the ground, the mechanism of this invention comes into play to release the clutch, while at the same time, it acts as a support to prevent miring in soft land.

A still further object of this invention is to produce a clutch releasing mechanism having adjustable elements so that the said mechanism can be set to suit the conditions of the land which is being treated, thus increasing its range of usefulness and efficiency.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1:
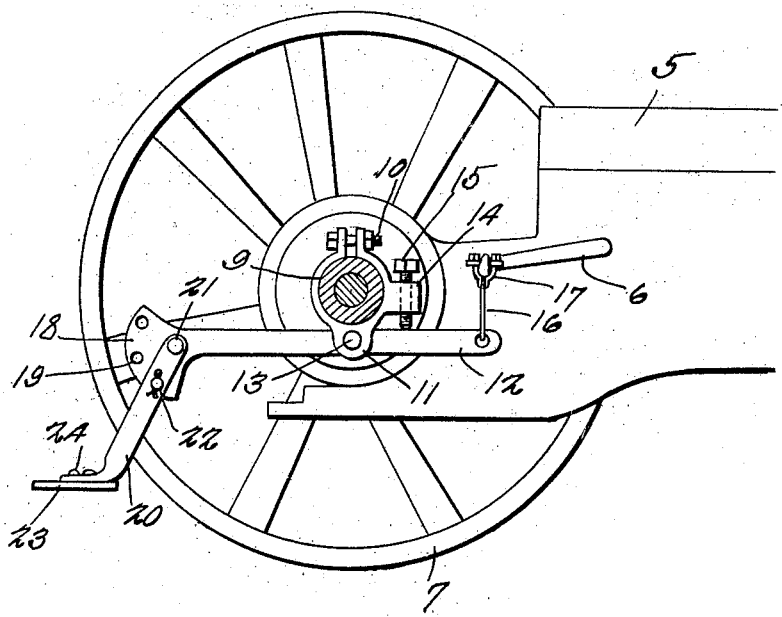
Figure 2:
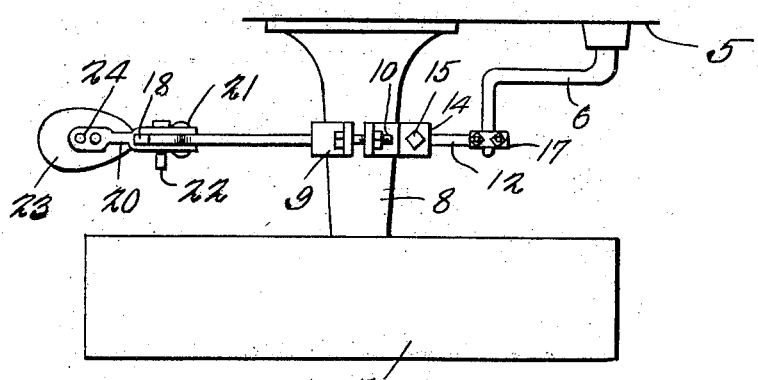

Figure 1 illustrates a view in elevation of a conventional showing of a tractor with the device embodying the invention applied thereto, and Fig. 2 illustrates a top plan view of the device, and a fragment of a tractor.

In these drawings 5 denotes a tractor motor casing and parts associated with it, the details of which are immaterial except that they include a clutch releasing crank 6 which, as here shown, is of known type and is intended to be actuated by a driver or operator for the purpose of releasing a clutch of the motor or transmission. The tractor is, of course, supplied with traction wheels such as 7 and axles or shafts 8.

The device embodying this invention and which illustrates but one embodiment of the invention comprises a clip 9 which may be secured to an axle such as 8 by a bolt 10, and the said clip 9 has a lug 11 to which the lever 12 is connected by the pivot 13 so that the said lever may oscillate freely. The clip is further provided with an apertured lug 14 in which a set screw 15 is threaded so that the lever may be held at different positions of adjustment for application to tractors of different types where the clutch operating lever may be differently set or arranged. The lever 12 has a link or cable 16 by which it is connected to a clip 17 secured to the crank 6, and therefore, the downward movement of the inner end of the lever 12 will swing the crank to release the clutch. The outer end of the lever 12 carries a quadrant 18 provided with apertures 19 for adjustment, as will presently appear, and the said lever has at its outer end an arm 20 mounted on the pivot 21 and held at different positions of adjustment by a pin 22 which extends through the arm and through one of the apertures 19 so that the arm may be set to cause an actuation of the lever 12 under different conditions. The outer end of the arm 20 extends at an angle to the main portion thereof, and a shoe 23 is secured to it by fastenings 24 such as rivets or the like, it being intended that the shoe shall bear against the surface of the soil or ground to prevent the wheel of the tractor from sinking too far, while at the same time it serves to cause an oscillation of the lever 12 to actuate the clutch crank 6.

It will be apparent that if the fastenings 22 were so arranged as to hold the arm 20 opposite any of the other apertures or holes 19 that the wheels of the tractor could sink farther into the soil before the shoe 23 would bear against the surface of the soil, and therefore, the clutch releasing mechanism would not be operated so quickly as it would be operated when the parts are in the position shown in Fig. 1.

A device made in accordance with this invention can be applied to tractors now in common use without changing their structure, it only being necessary to have clips of proper dimensions so that the lever can be oscillatably mounted with respect to the clutch operating mechanism.

I claim:

In a clutch releasing mechanism for tractors, a clip adapted to be anchored to a tractor axle, a lever pivotally connected to the clip, an apertured lug, a screw threaded therein engaging the lever for holding the lever at different positions of adjustment, means for connecting the lever at one end to a clutch operating mechanism, a quadrant at the opposite end of the lever, the said quadrant having apertures therein, an arm pivotally connected to the lever, a member extending through the arm and an aperture of the quadrant for holding the arm at different positions of adjustment.

DALMAR L. COX.